US009704193B2

(12) United States Patent
Lin-Hendel

(10) Patent No.: US 9,704,193 B2
(45) Date of Patent: *Jul. 11, 2017

(54) SYSTEM AND METHOD FOR CONSTRUCTING AND DISPLAYING ACTIVE VIRTUAL REALITY CYBER MALLS, SHOW ROOMS, GALLERIES, STORES, MUSEUMS, AND OBJECTS WITHIN

(71) Applicant: Catherine G. Lin-Hendel, Summit, NJ (US)

(72) Inventor: Catherine G. Lin-Hendel, Summit, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/847,257

(22) Filed: Sep. 8, 2015

(65) Prior Publication Data

US 2016/0132963 A1 May 12, 2016

Related U.S. Application Data

(63) Continuation of application No. 14/284,149, filed on May 21, 2014, now Pat. No. 9,135,654, which is a continuation of application No. 13/853,788, filed on Mar. 29, 2013, now Pat. No. 8,903,738, which is a continuation of application No. 13/037,356, filed on
(Continued)

(51) Int. Cl.
*G06Q 30/00* (2012.01)
*G06Q 30/06* (2012.01)
*G06F 3/0481* (2013.01)
*G06F 3/0482* (2013.01)
(Continued)

(52) U.S. Cl.
CPC ....... *G06Q 30/0643* (2013.01); *G06F 3/0482* (2013.01); *G06F 3/04815* (2013.01); *G06F 3/04842* (2013.01); *G06Q 30/0601* (2013.01); *G06Q 30/0603* (2013.01); *G06Q 30/0633* (2013.01); *G06Q 30/0639* (2013.01); *G06Q 30/0641* (2013.01); *G06T 19/006* (2013.01); *G06T 2219/028* (2013.01)

(58) Field of Classification Search
CPC .................. G06Q 30/0643; G06Q 30/0641
USPC .................................... 705/26, 27
See application file for complete search history.

(56) References Cited

U.S. PATENT DOCUMENTS 6,331,858 B2 * 12/2001 Fisher ........................ 345/582

OTHER PUBLICATIONS

BW: "Skoda Goes 3D on the Web with Superscape www.skoda-auto.cz," Business Wire, Jul. 6, 1998; Proquest #31434077, 3pgs.*

* cited by examiner

*Primary Examiner* — Rob Pond
(74) *Attorney, Agent, or Firm* — Douglas L. Weller

(57) ABSTRACT

A system and method for virtually displaying on-line a gallery, a showroom, a store, a mall or any other room or space and the objects contained in said room or space, wherein the data displayed is comprised of a virtual reality data packet. The system displays still photographs of virtual reality shots and textual materials, and plays virtual reality video clips and audio stores about the room and/or the objects contained therein. Links are associated with each object and are stored external to the virtual reality data packet can be retrieved on demand from an external database for presentation of the viewer. The system also provides on-line controls that enable the viewer to move around the space, and a feature that enables a viewer to view an object from 360° around the object.

20 Claims, 18 Drawing Sheets

Related U.S. Application Data

Feb. 28, 2011, now Pat. No. 8,433,616, which is a continuation of application No. 12/507,000, filed on Jul. 21, 2009, now Pat. No. 7,899,719, which is a continuation of application No. 09/631,238, filed on Aug. 2, 2000, now Pat. No. 7,574,381.

(60) Provisional application No. 60/147,716, filed on Aug. 6, 1999.

(51) Int. Cl.
*G06F 3/0484* (2013.01)
*G06T 19/00* (2011.01)

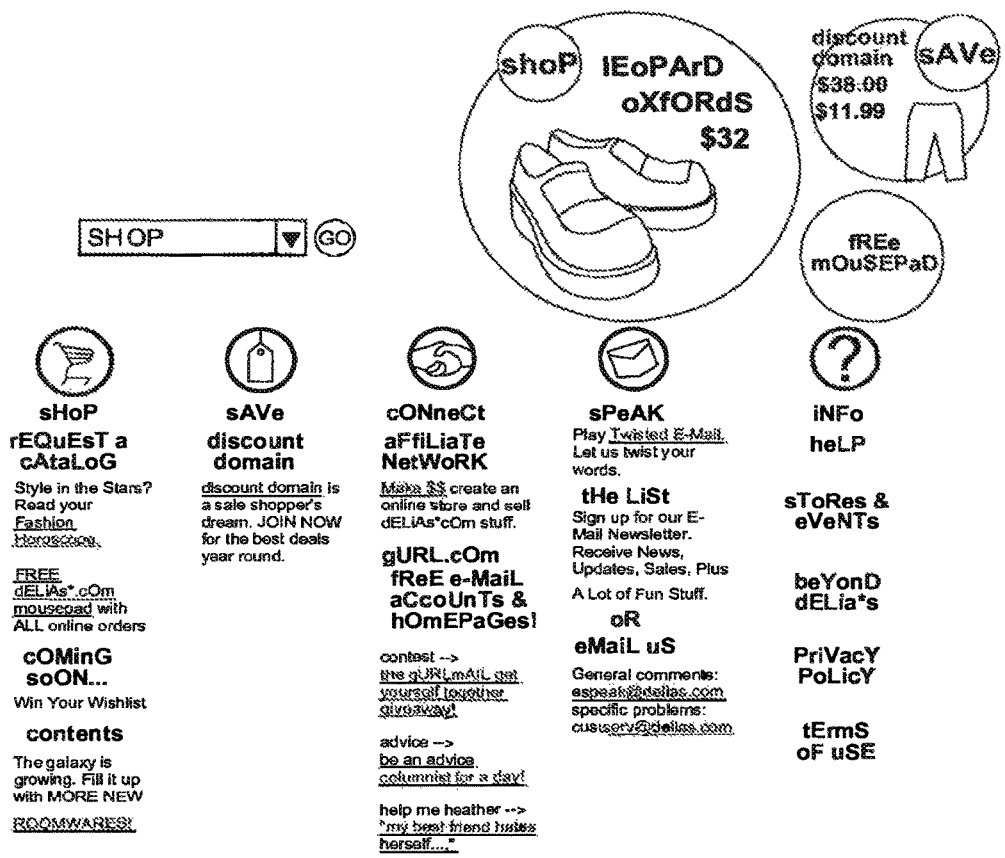
Prior Art
FIG. 1C.1

Prior Art
*FIG. 1C2*

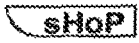
Prior Art
*FIG. 1C3* artnet.com®   ART SEARCH ENGINE [_____] ▼ [search]

home | | artists | auctions | printshow | bookstore | magazine

MORE
IN ARTNET
MAGAZINE

IN AUCTIONS:

*Arguing the Point* (detail)
Harry Roseland
oil on canvas
22 x 28 in.
Est. 10,000-15,000 USD

GO TO AUCTIONS

FEATURED LOTS:

Ansel Adams
Winter Sunrise, The Sierra Nevada...; 1944
Est. $7,500-9,000 USD

Arman
Waiting To Exhale; 1997
Est. $4,000-5,000 USD

Dennis Oppenheim
Search for Clues (Silver); 1976
Est. $300-400 USD

George Zimbel
Marilyn Monroe on the Set of The...; 1954
Est. $700-1,000 USD

Margaret Jordan Patterson
The Swans; c. 1915
Est. $1,400-1,800 USD

Roy Lichtenstein
Reflections on Minerva; 1990
Est. $13,000-15,000 USD

Andre Kertesz
Puddle New York; 1967
Est. $1,500-2,000 USD

Keith Haring
The Golden Child; 1986
Est. $8,000-9,000 USD

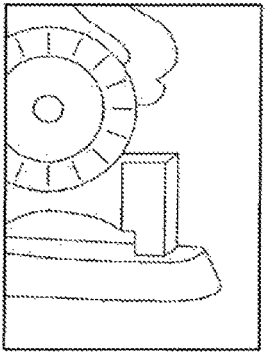
IN ANTIQUES:

Derek Roberts Fine Antique Clocks, Tonbridge, England
Two Train Skeleton Clock Based on Brighton Pavillion, c. 1860 (detail)

NEW GALLERIES:

Artemis Fine Arts Inc., New York.
B & D Studio Contemporanea, Milan.
Joan Barist Primitive Art, New York.
Bernabe Somoza Gallery, Houston
C.G. Boerner, Inc., New York
The Bradford Trust, Cape Cod
Brock Gallery, Action
Galerie Camille Burgi, Paris
Galleria Monica De Cardenas, Milan
Galerie Eric Coatalem, Paris
Gian Ferrari Arte Contemporanea, Milan
Frank H. Hogan Fine Arts, Inc. Orleans
Indigo, Frankfurt
Mercury Gallery, Boston
Meyerovich Gallery, San Francisco
Miller Block Gallery, Boston
Muse [X] Editions, Los

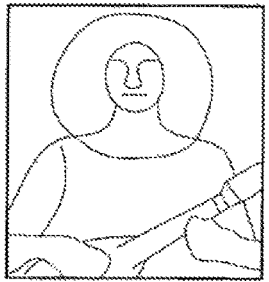
FEATURED BOOK:

*Pre-Raphaelite Women Artists* by Jan Marsh and Pamela G. Nunn
Published to accompany an exhibition in Manchester, England, this catalogue brings together paintings, drawings, photographs, and other works that women artists contributed to the Pre-Raphaelite movement.

NEW RELEASES:

David Hockney: Prints 1954-1995 The only available print catalogue raisonne, published in Japan.

Edward Ruscha: Editions 1962-1999 The much anticipated catalogue raisonne of the artist's print projects.

1999 Venice Biennale Catalogue The spectacular two-volume catalogue of the 48th Venice International Exhibition of Contemporary Art.

Jean-Michel Basquiat: Works on Paper The new catalogue raisonne from Galerie Enrico Navarra.

Art 20: The Thames and Hudson Multimedia Dictionary of Modern Art An invaluable

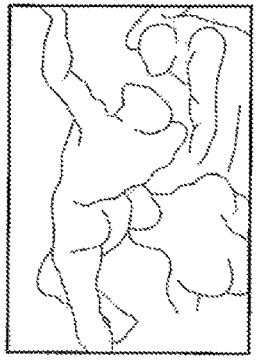
Peter Paul Rubens, *Anatomical Studies: Three Nudes, at Christie's*

OLD MASTER REPORT
by Paul Jeromack
Summer sales in London, plus Feigen finds Fra Angelico.

MY EYE
by Thomas Hoving
*Art for Dummies* and *"The American Century."*

DESIGN'S HIP ICONOCLAST
by Stanley Abercrombie
The late Tibor Kalman at the San Francisco MoMA

Sponsored by Herman Miller Furniture

GARRETT'S ATTIC
by Wendell Garrett

*Prior Art*
*FIG. 1D1*

Man Ray
Angers, 1930
Est. $6,000-8,000 USD

Mimmo Paladino
Untitled; 1985
Est. $25,000-30,000 USD

Donald Sultan
Untitled, July 23, 1977
Est. $10,000-$12,000 USD

Jane Peterson
Mont St. Michel
Est. $5,000-7,000 USD

Edward Weston
Oceano, 1936; printed 1970's
Est. $2,000-3,000 USD

Karl Blossfeld
Untitled, Gravures from
Unformen...;c. 1929
Est. $300-400 USD

Berenice Abbott
Flatiron Building, New York;
1938, printed c. 1970's
Est. $3,500-4,500 USD Angeles.
Nike Fine Arts Gallery, New York.
Parkett Editions, New York
S.J. Phillips Ltd., London.
Maya Polsky Gallery, Chicago.
Derek Roberts Fine Antique Clocks, Tonbridge.
Leslie Sacks Fine Arts, Los Angeles.
Salomon Stodel Antiques, Amsterdam.
Saggarah Fine Arts, Monaco.
Christopher Selzer, Santa Fe.
Galeria Tini Tapies, Barcelona.
Shoshana Wayne Gallery, Santa Monica.
Westland & Company, London.
XL Gallery, Moscow.

Are you selling art online...We are...click for testimonials.

and Macintosh.

Serge Poliakoff; Catalogue Raisonne of the Prints An exquisite production, edited by the artist's son Alexis.

Cezanne to Van Gogh: The Collection of Doctor Gachet The first comprehensive overview of the original collection, currently on view at the Metropolitan Museum of Art.

Lucio Fontana: Catalogue Rome A retrospective on the occasion or the artist's centenary celebration.

Chagall: Lithographs A new catalogue raisonne.

Sea Change: The Seascapes in Contemporary Photography Now on view at the International Center of Photography, New York.

room chairs for the William H. Vanderbilt Mansion in New York City.

Sponsored by

| GEORG | THE SILVER |
| JENSEN | FUND LIMITED |

The world's leading specialists in Georg Jensen silver

SIGN UP ▶ yourname@artnet.com    SUBSCRIBE TO THE   artnet.com
LOGIN ▶ FREE EMAIL FROM ARTNET.COM ✉         email auction alert site map member services resources dialogue about us                       add a site to the art search engine

©1999 artnet.com. All rights reserved. Artnet.com is a registered trademark of the ArtNet Worldwide Corporation, New York, NY.
Terms and Conditions

Prior Art
*FIG. 1D2*

All Items in Furniture
Current Auctions

For more items in this category, click these pages:
= 1 = 2 3 4 5 6 ... 20 ... 36 (next page)

| Item | Price | Bids | Ends PDT |
|---|---|---|---|
| MAGNIFICENT EGYPTIAN DINING ENSEMBLE | $5000.00 | - | 07/26 16:55 |
| Majorelle Armoire* | $8000.00 | - | 07/26 16:51 |
| Old Brass Ornamental Griffin Fireplace Fan | $9.99 | - | 07/23 16:51 |
| OLD HAND CRAFTED DOLL'S WARDROBE!! | $25.00 | - | 07/23 16:43 |
| MASSIVE CLAWFOOT OAK LAMP TABLE | $385.00 | - | 07/23 16:42 |
| OLD HEREKE PERSIAN Oriental Rug NiceRugs | $400.00 | - | 07/26 16:30 |
| An Encyclopedia of Desks By Mark Bridge 1988 | $9.50 | - | 07/23 16:29 |
| VICTORIAN EBONIZED/GILT INCISED SEWING BENCH | $29.99 | - | 07/21 16:29 |
| Furniture Refinishing: The Furniture Doctor | $5.00 | - | 07/23 15:58 |
| Mahogany Round Tea Table | $140.00 | - | 07/23 15:41 |
| French Style Desk | $290.00 | - | 07/26 15:32 |
| Armoire | $1500.00 | - | 07/26 15:30 |
| 1860's MAHOGANY CHEST OF DRAWS | $100.00 | - | 07/23 15:29 |
| *19thC. MAHOGANY FLAMBE 1 DRAWER STAND/TABLE* | $49.99 | - | 07/21 15:26 |
| Duncan Phyfe Pair of Lyre Mahogany Drum Table | $295.00 | - | 07/23 15:24 |
| Louis XVI Mahogany Bedroom Suit Antique | $595.00 | - | 07/23 15:10 |
| Officer's Folding Canopied Bed 1850's NICE | $250.00 | - | 07/26 15:08 |
| Glass Floor Protectors for Furniture | $3.00 | - | 07/23 15:03 |
| Antique Oak Office Chair | $25.00 | - | 07/26 15:02 |
| Old Old victorian Stand with engravings NEAT | $20.00 | - | 07/19 14:58 |
| Duncan Phyfe Mahogany Antique Sofa | $295.00 | - | 07/23 14:56 |
| STUNNING FRENCH ARMOIRE | $99.99 | - | 07/23 14:52 |
| Duncan Phyfe Mahogany Living Room Suit | $295.00 | - | 07/23 14:48 |
| Oak Rolltop Desk | $900.00 | - | 07/26 14:47 |
| * Leather Couches * tan double pillow | $100.00 | - | 07/26 14:47 |
| Duncan Phyfe Mahogany Dining Table Antique | $100.00 | - | 07/23 14:36 |
| Duncan Phyfe Mahogany Barrel Chair Antique | $75.00 | - | 07/23 14:33 | http://listings.ebay.com/aw/listings/hst/category1209/index.html 7/16/99

Prior Art

*FIG. 1E*

SYSTEM AND METHOD FOR CONSTRUCTING AND DISPLAYING ACTIVE VIRTUAL REALITY CYBER MALLS, SHOW ROOMS, GALLERIES, STORES, MUSEUMS, AND OBJECTS WITHIN

CROSS REFERENCE TO RELATED APPLICATIONS

This is a Continuation Application of U.S. patent application Ser. No. 14/284,149, filed on May 21, 2014, which is a continuation of U.S. patent application Ser. No. 13/853,788, filed on Mar. 29, 2013, which is a continuation of U.S. patent application Ser. No. 13/037,356, filed on Feb. 28, 2011; which is a continuation application of U.S. Pat. No. 7,899,719, filed on Jul. 29, 2009; which is a continuation application of U.S. Pat. No. 7,574,381, filed Aug. 2, 2000; which claims priority to U.S. Provisional Application Ser. No. 60/147,716, filed Aug. 6, 1999. The disclosures of all the foregoing patent documents are incorporated herein by reference as if fully set forth herein, including Figures, Claims, and Tables.

BACKGROUND OF THE INVENTION

In the brick-and-mortar world, showrooms, galleries, and stores are used to display furnishing, interior accessories, fashion, art, antiques, or other objects. Shopping centers, malls, and main streets are constructed to aggregate a large number of stores. The on-line equivalent of such commerce components are constructed with database containing information for such objects or stores sorted with nesting categories. The objects in conventional cyber stores, galleries, and show rooms are represented on the client/user computer screens as index lists of textual or thumbnail entries. The stores in a conventional cybermall are represented by a collection of "banner" entries (see FIGS. 1A, 1B, 1C1, 1C2, 1D1, 1E, 1F). Thumbnails are small graphical representation of an object, serving as an index and a link to detailed information regarding the object. Banner is a small graphical box-like icon with the logo and name of a business entity on the Web Clicking on a thumbnail usually brings an enlarged photograph and/or descriptions of the object from the server database to the client/user's computer screen. Clicking on a "banner" brings the user to the home page of the business entity the banner represents.

A typical on-line gallery or store, for example, would show category titles of the gallery collections or store items, with some textual entries or graphical thumbnails of selected "featured" exhibits or items. When a particular "last stop" category on a particular categorical path is clicked, the items or objects sorted under the category are presented in an index list of textual one-line or thumbnail entries. The index could be very long, and partitioned into many web pages (each may be several print pages long), accessible on-web page-at-a-time. Clicking on a textual or thumbnail entry or brings detailed textual description and an enlarged version of the thumbnail, if available, again only one-at-a-time (see FIGS. 1A1 and 1A2).

Virtual Reality software, such as Apple Computing Quick Time, or Macromedia Flash, on the other hand, has been developed to show scrolling panoramic views of a room or a scene, or to rotate a three-dimensional object to show its 360-degree views. The Virtual Reality source data is typically prepared by shooting multiple still photographs of a room, a scene, or an object from sequentially varying angles, and re-compose the still photographs in the correct spatial-time sequence to form a contiguous panoramic view. Video filming can also be used. Viewing the Virtual Reality image at the viewer's computer screen is controlled by the "mouse," a computer input device (see FIGS. 2A, 2B, and 2C) and the control buttons on the VR "viewing window" on the computer screen. The panoramic view of a scene is scrolled across the viewing window. The still shots from sequentially varying angles of a 3-D object is "flashed" onto the VR viewing window, producing an illusion of the object rotating in the window, given a large enough number of still shots, and fast enough speed of spatial-time re-composition or "flashing."

Virtual Reality has not been used in actionable on-line or electronic commerce environment, except for viewing purposes only, such as displaying a property or a house on-line on Real-Estate listing sites as in FIGS. 2A, 2B, and 2C; or, rotating a 3-D object, such as a car on car sites; or, for other purely entertainment purposes, such as displaying the content of a museum. In all cases, the Virtual Reality graphical data packet is treated as a single data entity with a single "packet address," accessed by clicking a VR or 3D button, and viewed by controlling the temporal scanning or rotation using the control buttons on the computer screen in conjunction with the button on the input device, the mouse. From within the Virtual Reality data packet, there is no link to the external world outside the data packet. Therefore, there is no practical application other than its visual and entertainment value. One cannot do anything with the Virtual Reality presentation of the known-art, other than looking at it and enjoying it.

The present invention relates to methods and apparatus to construct and display electronic/cyber/on-line showrooms, galleries, stores and malls to emulate the physical brick and mortar world, in additional to the conventional category and index listing e-commerce construct of the Web. Virtual Reality (VR) shots and/or Video films are made to visually present a show room, gallery, store, or object with more resemblance to the physical world we live. Each still picture of the VR shots or each frame of the video film is given a unique frame address. Each significant and unique object in the VR data packet is given a unique identification, indexed and addressed by the area the object occupies in a picture or a frame. Links are associated with each such object, such that detailed information (such as graphical, video, audio, or textual descriptions) related to the objects stored external to the VR date packet, can be retrieved from the database on demand, when the objects in the VR images are "selected"/"clicked."

BRIEF DESCRIPTION OF THE DRAWINGS

FIGS. 1B, 1C1 and 1C2 illustrate a prior art dELiAs.Com store listed under the AOL Apparel Stores.

FIGS. 1D1 and 1D2 illustrate prior art Artnet.Com Galleries.

FIG. 1E illustrates a prior art first print page of the first web-page of a 36 web-page Ebay Furniture listing.

DETAILED DESCRIPTION

Figure 1A:
FIG. 1A illustrates prior art on-line malls, stores, galleries, and showrooms.
Figure 1B:
Figure 1B:
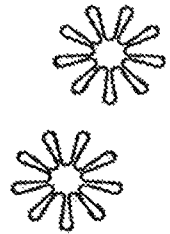
Figure 1F:
FIG. 1F illustrates a prior art Design Toscano Cyber Show Room.
Figure 2A:
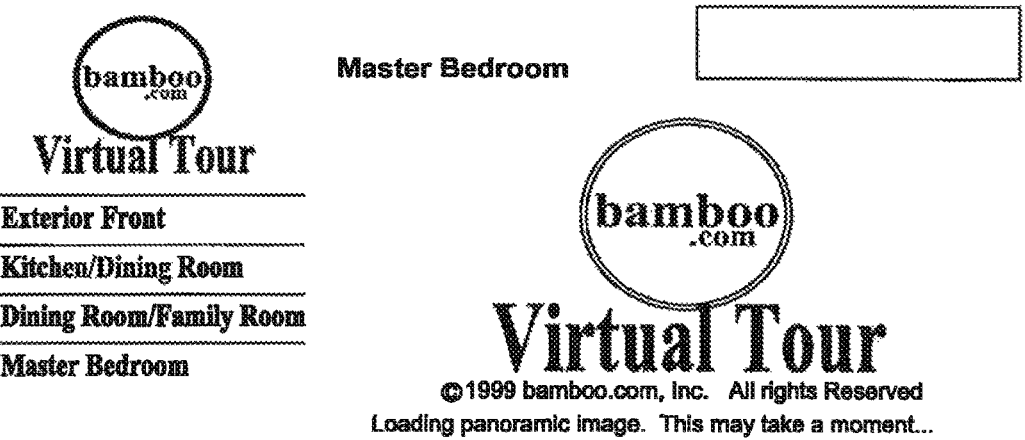
FIGS. 2A, 2B and 2C illustrate prior art Virtual Reality: Virtual touring of a home displayed on the www.bamboo.com web site. There is no other function beyond the visual tour: scrolling the panoramic image to the left, to the right, and look at it.
Figure 2A:

Referring again to prior art FIG. 2A, clicking on the "Exterior Front" selection on the menu at the left side, initiates the downloading of the "panoramic image of the exterior front view of the house from the server database, as noted under the "Bamboo.com/Virtual Tour" logo at the center of the page.

Figure 2B:
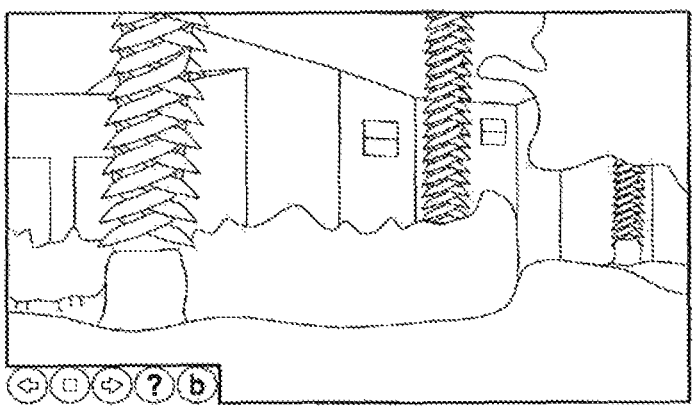
Figure 2C:

Referring again to prior art FIG. 2B, when the downloading of the panoramic image is complete, the exterior scene of the home scrolls across the "VR window" on the computer screen. The buttons on the lower left corner of the VR window are control buttons activated by the computer mouse. By moving the cursor to the "left" arrow, and pressing down Referring now to prior art FIG. 2C, clicking on the "Master Bedroom" selection on the menu at the left side of the page, causes the "panoramic" image of the master bedroom, to download from the site-server to the client/user's computer screen. The scrolling and stopping functions are identical to those in FIG. 2B.

The present invention relates to methods and apparatus to construct and display electronic/cyber/on-line showrooms, galleries, stores and malls to emulate the physical showrooms, galleries, stores, and malls. Virtual Reality (VR) shots with audio segments, and/or Video films are made to visually, audibly, and contiguously present a show room, gallery, store, or object. Each still picture 32A of the VR shots or each frame 30a, 30b, 30c, 30d, 30e, 30f, 30g, 30h, and 30i of the video film is given a unique frame address within the VR packet address. Thus, each picture 32A or each frame 30a, 30b, 30c, 30d, 30e, 30f, 30g, 30h, and 30i is identifiable via the address of the packet and the address of the frame 30a, 30b, 30c, 30d, 30e, 30f, 30g, 30h, and 30i. Each significant and unique object 32 in the VR data packet, is given an unique identification, indexed by the area 50 the unique object 32 occupies in the frames 30a, 30b, 30c, 30d, 30e, 30f, 30g, 30h, and 30i or pictures 32A containing the object. Links are assigned to that unique object 32, which may appear in multiple frames, such that detailed information (such as graphical, VR, video, audio, or textual descriptions) related to the object 32 addressed by the links, can be retrieved from the database external to the VR data packet, on demand, such as when the object 32 in the proximity frames is "clicked," from any of the proximity frames.

Clicking on a particular object 32 in a frame 30a, 30b, 30c, 30d, 30e, 30f, 30g, 30h, and 30i, or in any of the proximity frames 30b, 30c, 30d, 30e, 30f, 30g, and 30h in a VR presentation of a show room, gallery, or store, would select the link/links associated with the particular object 32 clicked, and store the links in a file on the client/use computer. Multiple objects can be "clicked,"—i.e., selected, within a VR presentation. When the viewing and the selection process is completed, and the collection of "clicked" links is submitted to the server, by clicking a "submit" button, all data, whether video, audio, VR, graphics, or textual, addressed by the links submitted are brought from the server database to the client/user/user computer with reference to each selected object.

Figure 3A:
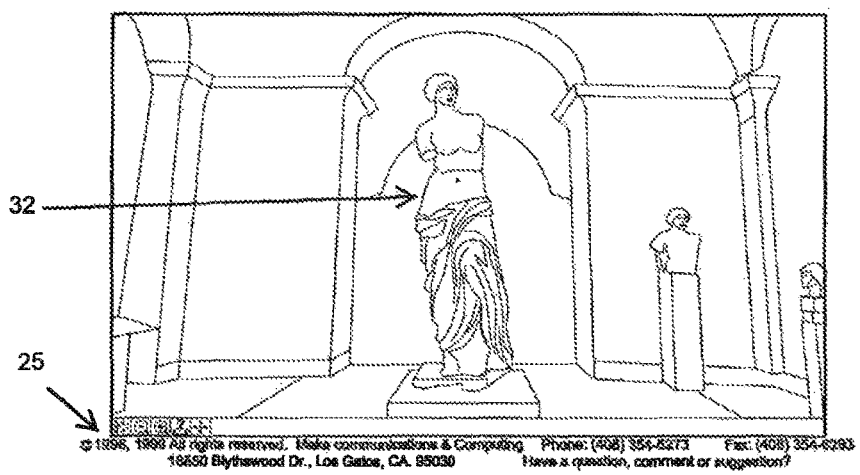
FIG. 3A illustrates a central scene and the primary object of a Virtual Reality presentation of a museum hall with small buttons at the lower left corner to scroll the panoramic scene of the Hall to the left, right, up, down and zoom-in and pan-out.
Figure 3B:
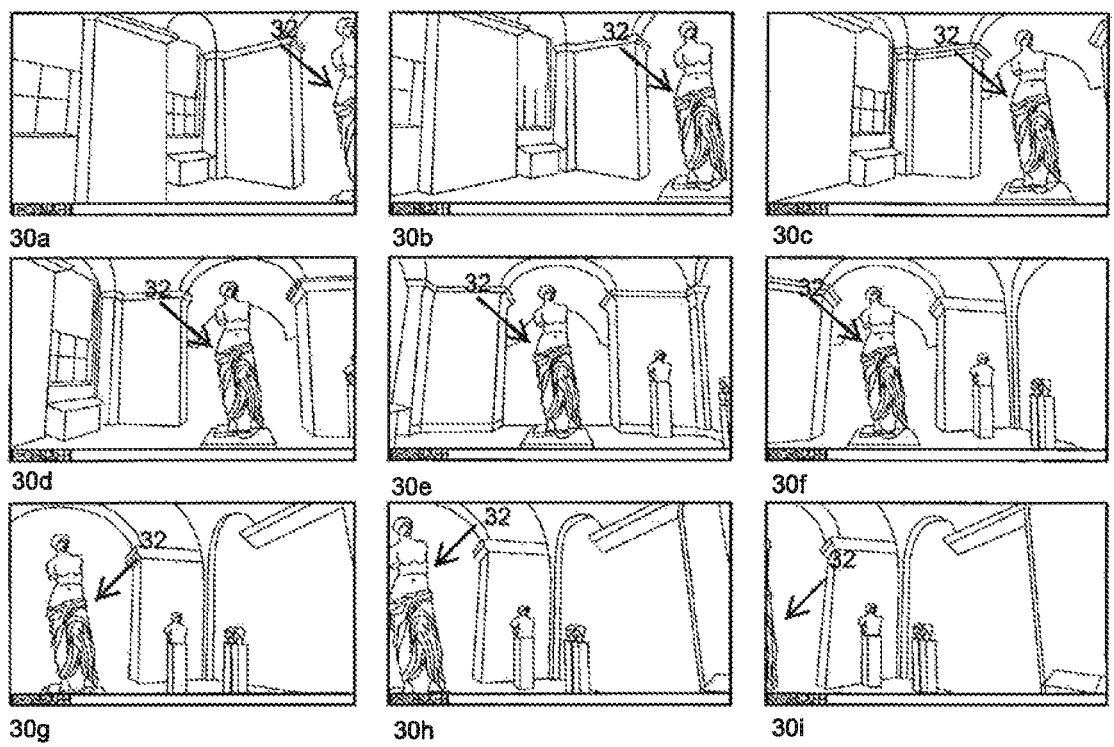
FIG. 3B illustrates nine Virtual Reality frames around the central object in the hall, scanning from the left of the object through the object, to the right of the object, each assigned its unique frame identity in the present invention.

FIG. 3A shows the central scene about a primary object 32, Venus of Milo of a Virtual Reality presentation of a museum hall. The small buttons 25 at the lower left corner scrolls the panoramic scene of the Hall to the left, right, up, down, and zoom-in and pan-out. A selected set of nine frames 30a, 30b, 30c, 30d, 30e, 30f, 30g, 30h, and 30i around the primary object 32 in this example, are shown in FIG. 3B. The limit of the conventional Virtual Reality of the known-art is here. There is no interaction or linking mechanism from inside the Virtual Reality images, such as these frames, to data outside of the VR packet. In FIG. 3B, there are nine Virtual Reality frames 30a, 30b, 30c, 30d, 30d, 30f, 30g, 30h, and 30i around the primary object 32 in the hall, scanning from the left of the object through the object, to the right of the object, each assigned its unique frame identity in the present invention.

In our implementation, each frame 30a, 30b, 30c, 30d, 30e, 30f, 30g, 30h, and 30i in the Virtual Reality data packet is given an identification. A primary object 32 that appears in multiple proximity frames would be "cut out" from the rest of each frame, or the scene, and given a unique identification, and assigned a link, or a collection of links, to link to external data storage space that stores data associated with the object 32. The primary object 32 appearing on several proximity frames, such as from FIG. 3B—frame 30b through frame 30h, would be identified as one object, and given the same set of links.

Figure 3C:
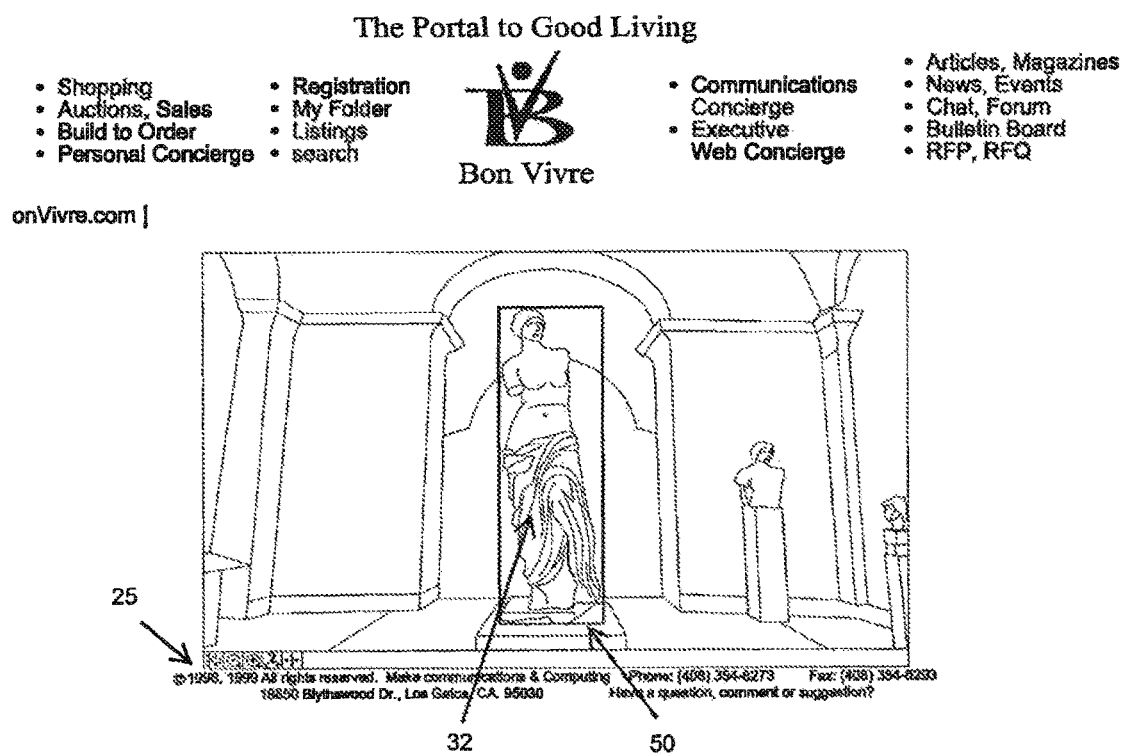
FIG. 3C illustrates a rectangular area closely surrounding the object that is cut, and marked out and identified separately from the rest of the picture/frame in accordance with the present invention.

A rectangular area 50 closely surrounding the object 32 in all of the proximity frames is cut as shown in FIG. 3C, and marked out and separated from the rest of the frame in order to be assigned a separate and unique identity to the object 32. This is done for frame 30b through frame 30h in FIG. 3B. The rectangular area 50 in all 7 frames 30b, 30c, 30d, 30e, 30f, 30g, and 30h are assigned the same identity representing the object 32, and the same links to the memory space external to the Virtual Reality Frames, containing the detailed information related to the object 32. Clicking within the rectangular area 50 in all 7 frames 30b, 30c, 30d, 30e, 30f, 30g and 30h results in linking to the same set of data.

Figure 3D:
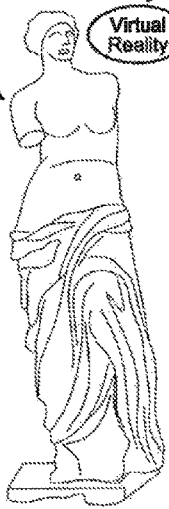
FIG. 3D illustrates an example of data stored in memory space external to the Virtual Reality data packet, linked to the object image from within the Virtual Reality data packet.
Figure 3D:

FIG. 3D shows frames, video, or VR can all be linked and called on demand. In this example, the enlarged still image 32A in FIG. 3D is further linked to another virtual Reality data packet that presents the object in 360-degree rotation.

Figure 3E:
FIG. 3E illustrates the object with control buttons at the lower left corner resulting from activation of the "Virtual Reality" button in FIG. 3D in accordance with the present invention.
Figure 3F:
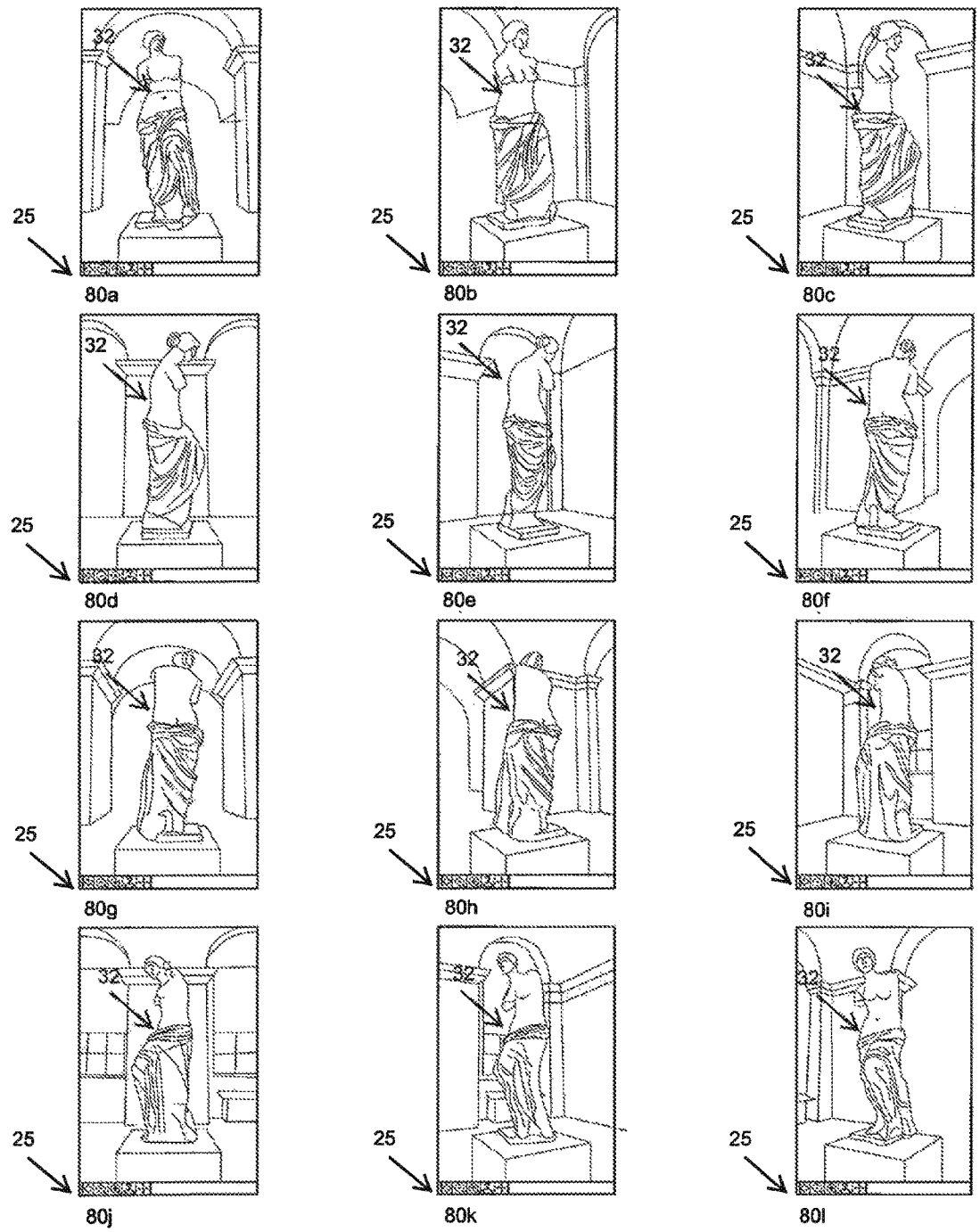
FIG. 3F illustrates 12 of the standard 36 frames shot form equally spaced angles 360-degrees around the object in accordance with the present invention.

Referring now to FIG. 3E, clicking the "Virtual Reality" button 70 in FIG. 3D, brings the "rotating" Virtual Reality data packet of the object, with the control buttons 25 at the lower left corner. FIG. 3F shows the 12 of the standard 36 frames 80a, 80b, 80c, 80d, 80e, 80f, 80g, 80h, 80i, 80j, 80k and 80l shot from equally spaced angles, 360-degrees around the object. When the number of shots and the speed of sequentially "flashing in" the still images into the viewing window are compatible, human eyes perceive that the object rotates on the viewing window. A larger number of shots would permit a smoother and slower rotation.

The invention enables practical and actionable commerce applications of Virtual Reality and Video casting or screaming technologies on the web, for example, in displaying objects in show rooms, galleries, stores, or stores in malls, shopping centers, or on main streets in a "real life", in addition to conventional categorization, search, and listing presentations in the convention web stores and galleries. The current invention enables object images to be linked to additional textual, audio, graphical, video, or VR data stored in the database outside of the Virtual Reality or Video data packet. Clicking on the image of a sofa in such an "active Virtual Reality" show room of this invention for example, of an interior furnishing show room, would deposit the links associated with the image to a temporary file. When the entire VR or Video presentation is viewed, and the selection of multiple interested objects shown in the VR presentation is completed, the collection of links of the objects selected is submitted to the server from the client/user computer, to retrieve data addressed by the submitted links, including but not limited to detailed audio or textual descriptions, additional graphics or VR presentations, pricing information and ordering/or buying submission mechanism, sorted and presented by each object at command.

The present invention is implemented using software which can be written in many programming languages, or implemented with many web-page generation tools. The present invention can be used on a global or local computer network, on a personal computer, on viewable storage media such as a CD ROM, on a wireless telephone, on a wireless personal assistant such as a Palm Pilot®, or on any type of wired or wireless device that enables digitally stored information to be viewed on a display device. Also, information displayed and viewed using the present invention can be printed, stored to other storage medium, and electronically mailed to third parties.

Numerous modifications to and alternative embodiments of the present invention will be apparent to those skilled to the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

The invention claimed is:

1. A computer implemented method, comprising:
displaying a virtual reality scene, wherein the virtual reality scene exhibits a plurality of objects selectable by a user, the virtual reality scene being built from a plurality of images representing varied views of a physical scene and varied views of the plurality of objects;
enabling a user to navigate within the virtual reality scene and observe the virtual reality scene from one or more perspectives;
receiving from a user a selection corresponding to at least one of the plurality of objects within the virtual reality scene; and
in response to receiving from the user the selection of the at least one object, activating a link to an actionable commerce application comprising a submission mechanism that allows the user to place an order for the at least one selected object.

2. The computer implemented method of claim 1, wherein each image has a unique image address.

3. The computer implemented method of claim 1, wherein upon receiving from the user a selection of a selectable object within the virtual reality scene, additional information regarding the selected object is displayed.

4. The computer implemented method of claim 3, wherein the additional information includes information related to the creator of the selected object digitally represented in the virtual reality scene.

5. The computer implemented method of claim 3, wherein the additional information includes the price of the selected object digitally represented in the virtual reality scene.

6. The computer implemented method of claim 3, wherein the additional information includes the present bid amount for the selected object digitally represented in the virtual reality scene.

7. The computer implemented method of claim 3, wherein the additional information includes digital representations of one or more objects created by the same creator of the selected object.

8. The computer implemented method of claim 1, wherein the selectable object is indexed by an area that the representation of the selectable object occupies in the virtual reality scene.

9. The computer implemented method of claim 8, wherein the user selects the selectable object by indicating the area that the selectable object occupies, using an input device.

10. The computer implemented method of claim 8, wherein the user selects the selectable object by activating an input mechanism indicative of the area that the representation of the selectable object occupies.

11. The computer implemented method of claim 1, wherein the selectable object corresponds to a digital representation of at least one of a painting, sculpture, photograph, furniture, tapestry and rug.

12. A system comprising:
a computer readable storage medium capable of non-transitorily storing one or more programs configured for execution by one or more computer processors, wherein the one or more processors are communicatively coupled to a display device configured to be controlled by the one or more programs, the one or more programs comprising instructions that cause the one or more processors to:
display on the display device a virtual reality scene, wherein the virtual reality scene exhibits a plurality of objects selectable by a user, the virtual reality scene being built from a plurality of images representing varied views of a physical scene and varied views of the plurality of objects;
enable a user to navigate within the virtual reality scene and observe the virtual reality scene from one or more perspectives;
receive from the user a selection of a selectable object within the virtual reality scene;
in response to receiving from the user the selection of the selectable object, activating a link to an actionable commerce application comprising a submission mechanism that allows the user to place an order for the selected object.

13. The system of claim 12, wherein each image has a unique image address.

14. The system of claim 12, wherein upon receiving from the user a selection of a selectable object within the virtual reality scene, additional information regarding the object is displayed.

15. The system of claim 14, wherein the additional information includes information related to the creator of the selected object digitally represented in the virtual reality scene.

16. The system of claim 14, wherein the additional information includes the price of the selected object digitally represented in the virtual reality scene.

17. The system of claim 14, wherein the additional information includes the present bid amount for the selected object digitally represented in the virtual reality scene.

18. The system of claim 14, wherein the additional information includes digital representations of one or more objects created by the same creator of the selected object.

19. The system of claim 12, wherein the selectable object is indexed by an area that the representation of the selectable object occupies in the virtual reality scene.

20. The system of claim 19, wherein the user selects the selectable object by indicating the area that the selectable object occupies, using an input device.

* * * * *